(12) United States Patent
Reese (10) Patent No.: US 7,607,740 B2
(45) Date of Patent: Oct. 27, 2009

(54) WHEEL ASSEMBLY FOR VEHICLE HAVING DRIVE PLATES IN WHICH FORCES EXCEEDING A LEVEL ARE NOT TRANSFERRED TO THE AXLE

(75) Inventor: Alan Richard Reese, Wylam (GB)

(73) Assignee: Pearson Engineering Limited (GB)

( * ) Notice: Subject to any disclaimer, the term of this patent is extended or adjusted under 35 U.S.C. 154(b) by 0 days.

(21) Appl. No.: 10/531,364

(22) PCT Filed: Nov. 21, 2003

(86) PCT No.: PCT/GB03/05088

§ 371 (c)(1),
(2), (4) Date: Oct. 25, 2005

(87) PCT Pub. No.: WO2004/052661

PCT Pub. Date: Jun. 24, 2004

(65) Prior Publication Data

US 2006/0119171 A1 Jun. 8, 2006

(30) Foreign Application Priority Data

Dec. 11, 2002 (GB) ................................ 0228899.1

(51) Int. Cl.
*B60B 3/14* (2006.01)

(52) U.S. Cl. .............. 301/6.1; 301/35.621; 301/35.629; 301/111.04; 301/111.07; 301/105.1

(58) Field of Classification Search ................. 301/6.1, 301/35.55, 35.58, 35.621, 35.63, 35.622, 301/35.628, 35.629, 111.01, 111.03, 111.04, 301/111.07, 105.1, 128, 6.5, 36.3

See application file for complete search history.

(56) References Cited

U.S. PATENT DOCUMENTS

| 1,220,535 | A | * | 3/1917 | O'Connor | 301/35.628 |
|---|---|---|---|---|---|
| 1,464,812 | A | * | 8/1923 | Fine | 301/35.58 |
| 1,887,544 | A | * | 11/1932 | Codd | 301/36.3 |
| 2,599,120 | A | * | 6/1952 | Meiling | 301/35.63 |
| 2,609,247 | A | * | 9/1952 | Carter | 301/38.1 |
| 2,779,630 | A | * | 1/1957 | Klinker | 301/35.629 |
| 2,804,157 | A | * | 8/1957 | Preston | 180/340 |

(Continued)

FOREIGN PATENT DOCUMENTS

FR 1586632 * 2/1970

(Continued)

*Primary Examiner*—Russell D Stormer
(74) *Attorney, Agent, or Firm*—Jack Schwartz & Associates, PLLC (57) ABSTRACT

A wheel assembly for a vehicle such as a tractor is disclosed. The assembly comprises a wheel rim (10) for supporting a tire, a nave plate (11) mounted to the rim, and a drive plate (21) mounted to an axle flange (26). A torque ring (18) has first key ways (16, 17) for cooperating with first keys (14, 15) on nave plate (11), and second key ways (19, 20) for cooperating with second keys (22, 23) on drive plate (21). In this way, torque and radial and axial forces are transferred between the drive plate (21) and nave plate (11), but radial or axial forces, tending to remove the assembly from the axle, and exceeding respective predetermined levels, are prevented from being transferred from the nave plate (11) to the axle.

9 Claims, 5 Drawing Sheets

U.S. PATENT DOCUMENTS

| | | | | |
|---|---|---|---|---|
| 3,139,309 A | * | 6/1964 | Breton | 301/36.3 |
| 3,840,273 A | * | 10/1974 | Johns | 301/36.1 |
| 4,007,968 A | * | 2/1977 | Solis | 301/38.1 |
| 4,473,258 A | * | 9/1984 | Fox | 301/36.1 |
| 4,526,425 A | * | 7/1985 | Schroeder | 301/36.1 |
| 4,718,732 A | * | 1/1988 | Osborne | 301/36.1 |
| 4,818,031 A | * | 4/1989 | Brown | 301/36.1 |
| 4,925,249 A | * | 5/1990 | Auspelmyer | 301/111.01 |
| 5,139,314 A | * | 8/1992 | Deckler | 280/400 |
| 6,193,320 B1 | * | 2/2001 | Weiss | 301/35.63 |
| 6,286,910 B1 | * | 9/2001 | Kuhlman | 301/111.01 |
| 6,390,564 B1 | * | 5/2002 | Thomas | 301/13.2 |
| 6,435,071 B1 | * | 8/2002 | Campbell | 89/36.08 |
| 7,287,819 B2 | * | 10/2007 | McNeil | 301/35.629 |

FOREIGN PATENT DOCUMENTS

| | | | |
|---|---|---|---|
| GB | 136400 | * | 12/1919 |
| JP | 59-118502 | * | 7/1984 |

* cited by examiner

WHEEL ASSEMBLY FOR VEHICLE HAVING DRIVE PLATES IN WHICH FORCES EXCEEDING A LEVEL ARE NOT TRANSFERRED TO THE AXLE

The present invention relates to a wheel assembly for a vehicle, and relates particularly, but not exclusively, to a wheel assembly for minimising injury to occupants of a vehicle as a result of an explosion under the wheel assembly. The invention also relates to a vehicle incorporating at least one such wheel assembly.

A substantial risk to vehicles and their occupants is posed by anti-tank mines buried slightly below the surface of the ground as a result of ongoing or previous warfare. Although military vehicles entering minefields are generally armoured and therefore protected to a certain extent from the effect of explosions, the occupants of civilian vehicles encountering such mines are at substantial risk of injury or death as a result of such mines.

Most anti-tank mines are detonated by means of a substantial load applied to the upper surface of the mine, as a result of which a mines usually explodes under one of the wheels of a vehicle passing over the mine. A major part of the energy of the explosion is transmitted into the vehicle through the wheel and its connection to the body of the vehicle, with some energy being transferred to the vehicle as a direct effect of the blast on the body of the vehicle. This latter effect can be a relatively minor effect, depending upon the shape and weight of the vehicle, and the distance between the body of the vehicle and the bottom of the wheel.

However, in a conventional wheel and axle assembly, the wheel is very firmly attached to the vehicle by a very strong axle and suspension. It is necessary for the axle and suspension to be strong because the main forces between the vehicle and the ground are transmitted through this assembly. However, if an anti-tank mine explodes under one of the wheels, the same axle and suspension transmits a significant amount of energy from the blast to the body of the vehicle and can cause significant injury or event death to its occupants.

Vehicles intended for use where the risk of exploding mines is high may have the whole axle and spring and shock absorber assembly fixed to the vehicle chassis so that it can be blown off without damage to the vehicle fixing points. This enables the whole assembly to be replaced easily, but is generally only applicable to special purpose military vehicles, and not applicable to civilian vehicles, such as agricultural vehicles. This arrangement also suffers from the drawback that the damage is still extensive and the time taken to repair it is considerable.

Preferred embodiments of the present invention seek to overcome the above disadvantages of the prior art.

According to an aspect of the present invention, there is provided a wheel assembly for a vehicle, the assembly comprising:—
a wheel rim;
a first support plate mounted to said rim;
a second support plate adapted to be mounted to an axle;
first coupling means, connected between said first and second support plates, for transferring torque between said first and second support plates; and
second coupling means, connected between said first and second support plates, for transferring radial and axial forces from said first support plate to said second support plate;

wherein said first and second coupling means are incapable of transferring, from said first support plate to said second support plate, radial or axial forces, tending to remove the assembly from the axle, and exceeding respective predetermined levels.

This provides the advantage that axial and radial forces exceeding respective predetermined levels, which are the predominant components of the forces generated by a mine exploding under a wheel of a vehicle carrying the assembly, are prevented from being transferred to the axle, and therefore to the vehicle body. This in turn minimises the extent of injury to the occupants of the vehicle and the extent of damage to the vehicle.

Said first coupling means may comprise torque transfer means adapted to transfer torque from said second to said first support plate.

Said torque transfer means may include at least one body member having first engaging means for enabling the or each said body member to slide in a first direction relative to said first support plate, and second engaging means for enabling the or each said body member to slide in a second direction, not parallel to said first direction, relative to said second support plate.

Said torque transfer means may include at least one body member and a plurality of first linkages pivotably connected between at least one said body member and said first support plate, and a plurality of second linkages pivotably connected between at least one said body member and said second support plate.

The second coupling means may further include at least one first coupling member connected between said first and second support plates and adapted to fracture as a result of application thereto of radial or axial forces exceeding said respective predetermined levels.

The first and/or second coupling means may include a plurality of second coupling members adapted to fracture as a result of fracture of at least one said first coupling member.

Said second support plate may be adapted to be mounted to said axle via a gearbox.

Said second support plate may define a region of decreasing cross section in a direction transverse to said axle.

This provides the advantage of reducing the extent to which the assembly becomes trapped on the axle as a result of an explosion under the wheel assembly.

The assembly may further comprise removable securing means for securing said assembly to the axle.

This provides the advantage of enabling the wheel assembly to be more securely attached to the axle when the risk of explosion under the wheel assembly is less, for example when the vehicle is travelling on public roads.

According to another aspect of the present invention, there is provided a vehicle comprising:
a chassis;
a cab for accommodating at least one occupant;
at least one wheel assembly as defined above; and
a respective axle provided on the chassis for supporting the or each said wheel assembly.

Preferred embodiments of the present invention will now be described, by way of example only and not in any limitative sense, with reference to the accompanying drawings, in which:—

Figure 1:
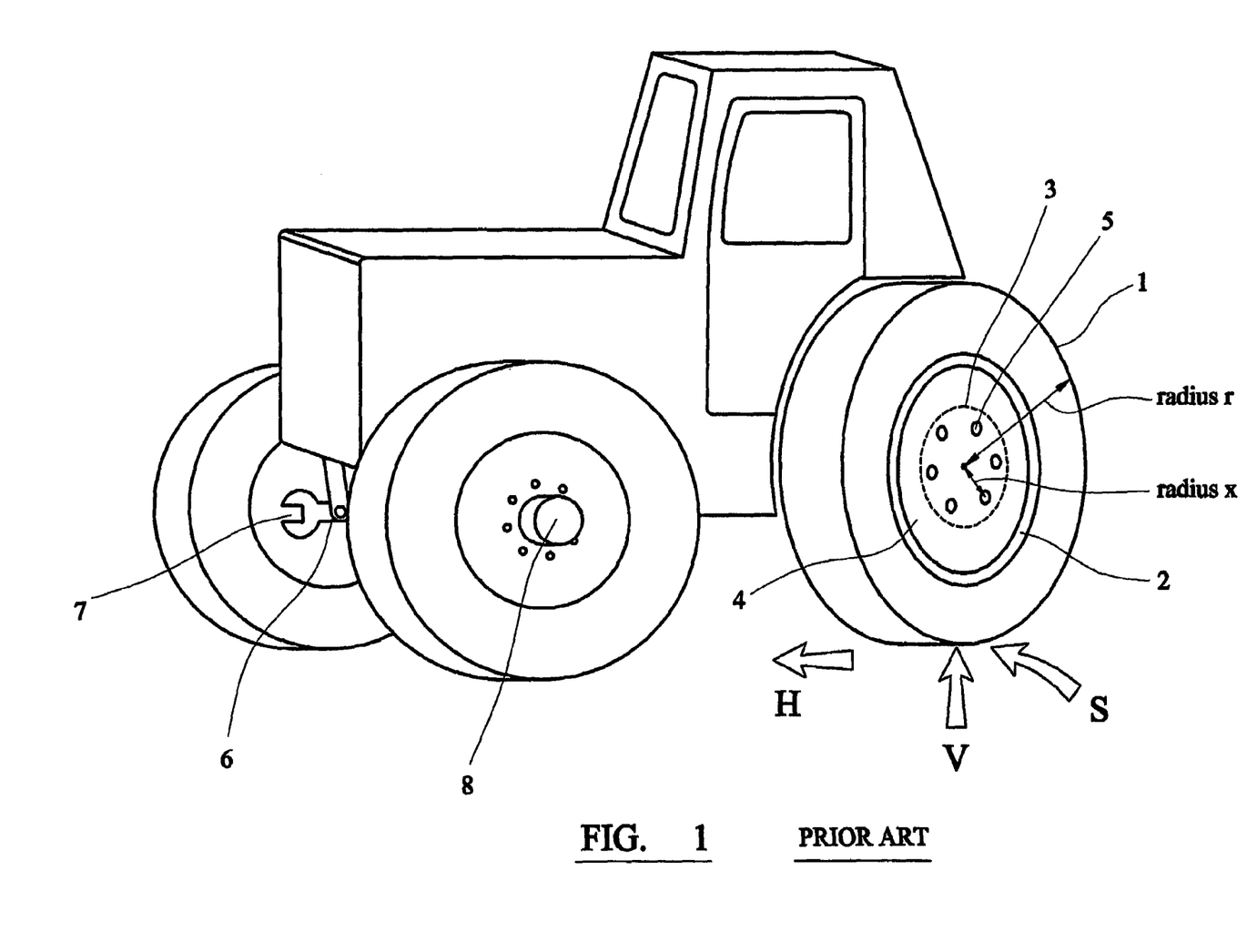
FIG. 1 is a schematic representation of a prior art agricultural tractor.

FIG. 1 shows a prior art agricultural tractor, which is particularly suitable for operation in a mine field because the chassis and driver's cab are narrow and well separated from the wheels, which are set far out from the center of the vehicle on strong axles that offer little resistance to blasts. The tractor has front and rear wheels, each rear wheel having a tire (1) of rolling radius r, mounted on a rim (2) which is connected to an axle flange (3), by means of a nave plate (4), through a number of bolts (5) which are arranged in a circle of radius x. The front axle of the tractor can pivot about a horizontal axis (6), each front wheel being steerable through a mechanism (7) and having a gearbox (8) protruding out beyond the corresponding nave plate.

The external forces acting on the rear wheels come from the ground, and may be conveniently divided into a vertical component V, a horizontal thrust H and a sideways force S. These forces are reacted from the tractor through the corresponding axle flange (3) by means of the bolts (5).

The tire (1) is designed to achieve a very good grip on the ground, and the coefficient of friction is therefore high, and may be as high as 1. For the purposes of design, the forces H and S may therefore be taken as equal to V. With a heavy implement mounted behind the tractor, the whole weight W of the tractor and implement may effectively be carried on the rear tires (1).

If the direction of V is considered as radial, that of S as axial, and that of H as longitudinal, the force H is communicated to the wheel by a torque at the axle having a magnitude H x r, where r is the rolling radius of the tire (1). The number n and diameter d of the bolts holding the wheel to the axle flange (3) at a pitch circle of radius x have to be sufficient to carry the torque H x r. It will therefore be appreciated that the shear strength Q of each bolt will need to be greater than $$nQ = r/xH.$$

A typical large tractor tire has r=860 mm and x=138 mm, from which it can be seen that nQ =approximately 6.2 V, because H is approximately equal to V. It can therefore be concluded that conventional wheels are fixed to the axles by an arrangement of bolts which, if they are strong enough to carry the torque, are several times stronger than is required to carry the vertical loads. This applies to a wide range of wheels used on most vehicles, including passenger cars.

As a result, if such a wheel when mounted to a vehicle runs over a mine, the resulting explosion applies a generally vertical load to the wheel, which becomes large enough to destroy the wheel, damage the axle and transmit shock loads into the vehicle large enough to kill or injure the occupants of the vehicle.

Figure 2:
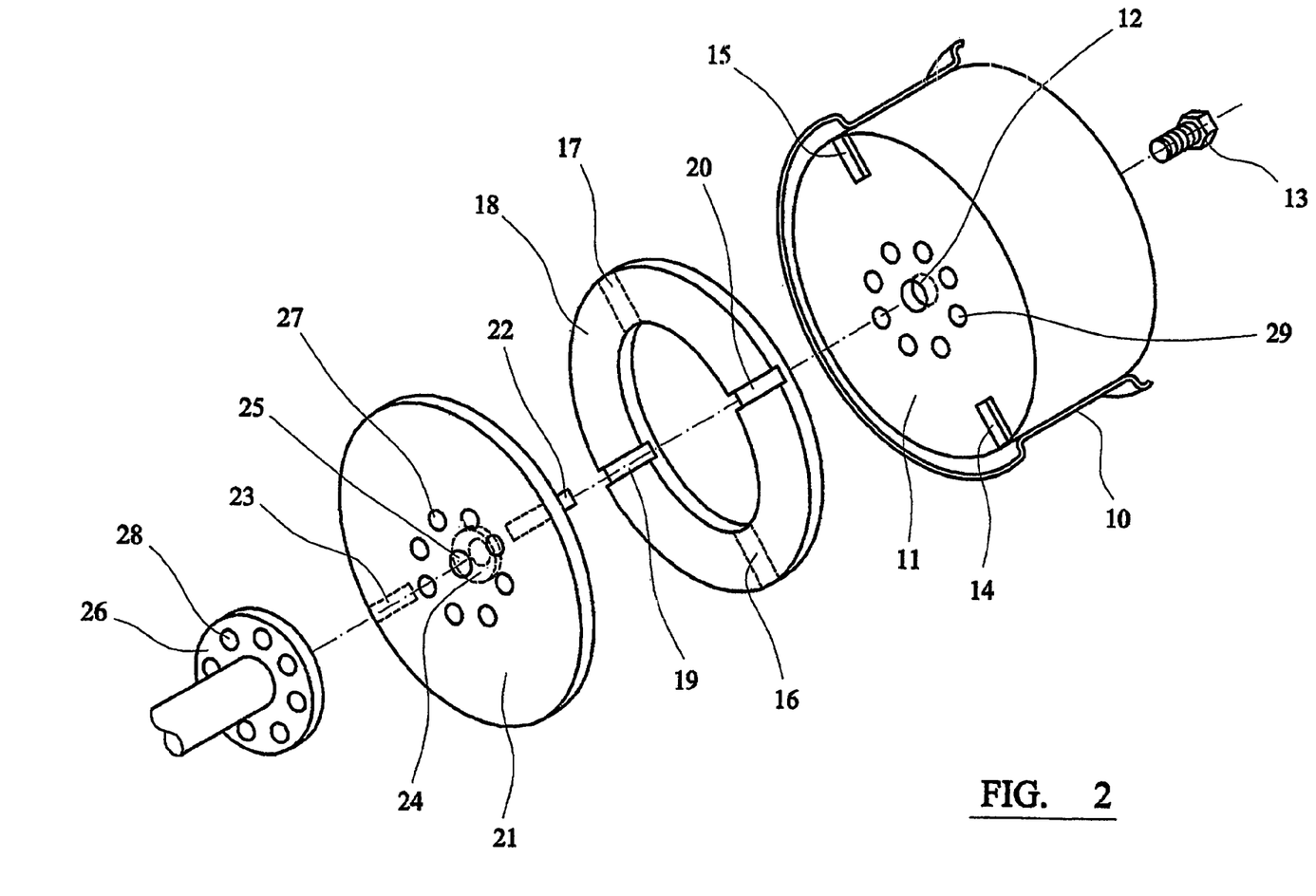
FIG. 2 is an exploded perspective view of a wheel assembly of a first embodiment of the present invention.

Referring now to FIG. 2, a wheel assembly of a first embodiment of the present invention has a wheel rim (10) welded to a first support plate in the form of nave plate (11) which has a generally circular hole 12 in its center, which is a close fit on a second coupling device in the form of a shear bolt (13). A second engaging device in the form of two keys (14, 15) are provided at diametrically opposite locations across the nave plate (11), the two keys (14, 15) being a sliding fit within corresponding key ways (16, 17) cut in the face of torque transfer device provided as a body member in the form of a torque ring (18). A first coupling or engaging device in the form of two further key ways (19, 20) are cut on the opposite face of the torque ring (18), the key ways (19, 20) being located on a diameter generally at right angles to the diameter through key ways (16, 17).

A second support plate or drive plate (21) carries keys (22, 23) for slidably engaging key ways (19, 20) on torque ring (18). The drive plate (21) also has a central boss (24) which protrudes towards nave plate (11), a distance slightly less than the thickness of torque ring (18). A threaded hole (25) in the boss (24) receives the thread of shear bolt (13) so that the shear bolt (13) can be tightly screwed into hole (25) to hold the wheel assembly together to form a single wheel having a composite nave plate across the face of the rim (10). This assembly can then be bolted to a vehicle axle flange (26) by means of removable securing devices in the form of bolts passing through holes (27, 28) in the drive plate (21) and the axle flange (26) respectively. A set of larger holes (29) is also provided in nave plate (11) to allow a box type spanner (not shown) to be used to tighten the nuts or bolts used on the axle flange (26).

Figure 3:
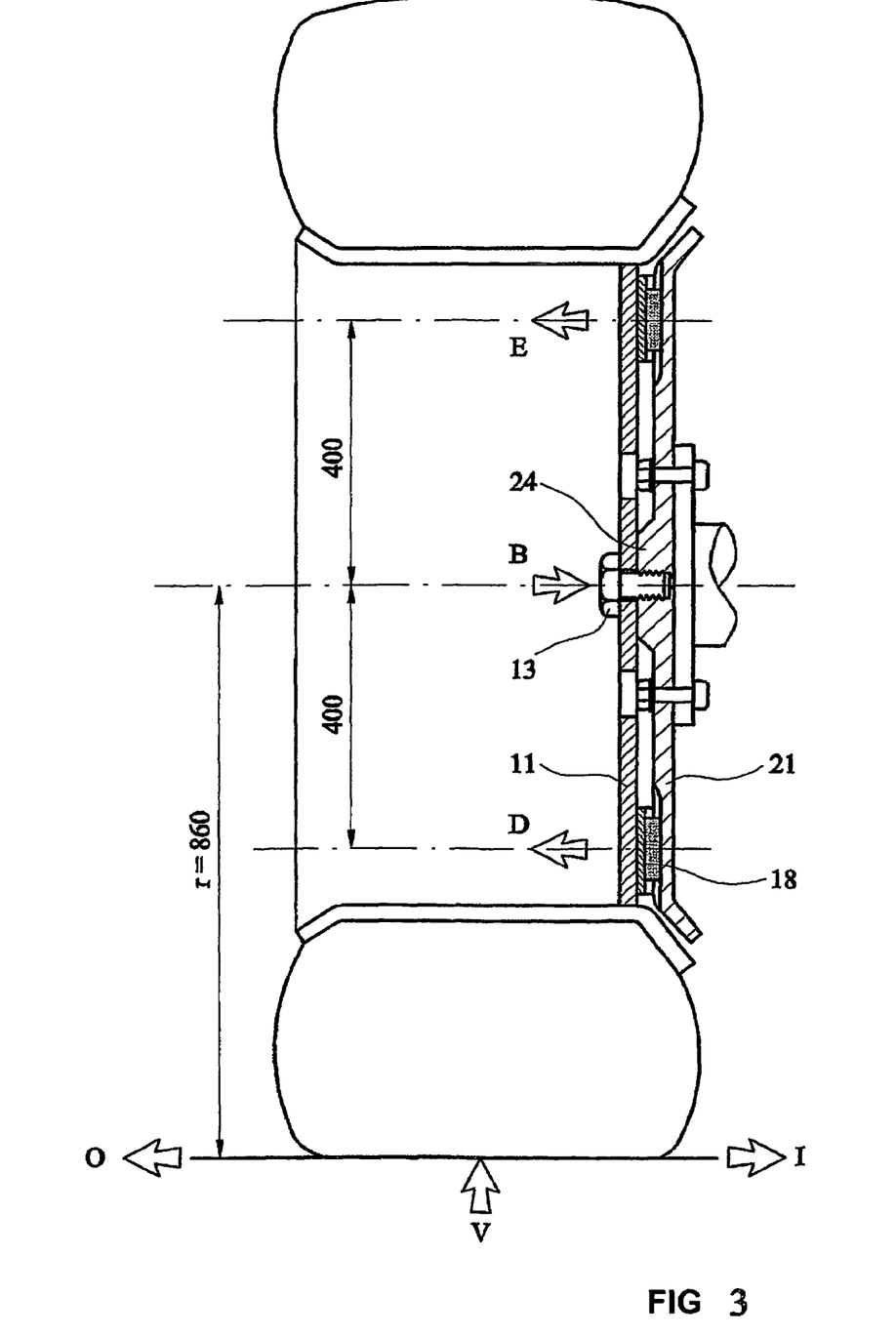
FIG. 3 is a cross sectional elevation view of the wheel assembly of FIG. 2 carrying a tire.

As shown in FIG. 3, which shows a side cross-sectional view through the wheel assembly of FIG. 2 but having a tire (30) mounted on the wheel rim (10), it can be seen that in the position shown with one of the pairs of keys (14, 15) or (22, 23) arranged vertically, only the shear bolt (13) prevents the torque ring (18) sliding upwards relative to the drive plate (21) or the nave plate (11) sliding upwards relative to the torque ring (18). When the corresponding key ways (16, 17) or (19, 20) are angled relative to the ground, there is some friction between the keys and the corresponding key ways, and it is found that when an explosion occurs, the friction is mainly due to the inertia of the torque ring (18), which should therefore be kept as light as possible.

FIG. 3 shows typical dimensions of a large tractor wheel and tire (30), and provides a basis for demonstrating a way in which the single shear bolt (13) supports the vertical load V and also either an outward sideways load O or an inward sideways load I when the tractor is working normally and shears off at an appropriate load as a result of an explosion.

The inward load I puts compression into the drive plate (21) via the torque disc (18) producing the outward force D on the nave plate (11) and a tensile force B in the shear bolt which can be readily calculated as 400/460I or 0.87 I.

When the sideways force is outward, O puts the assembly of plates at the top into compression at E and the shear bolt is in tension of 1260/400×O=3.15×O. The maximum value of O is approximately V. This is the worst case of lateral loading.

For a wheel of the dimensions shown a 20 mm diameter Grade 8.8 bolt is appropriate. This bolt shears at about 11 ton and fails in tension at about 20 ton, so that the device can carry a vertical load of about 11 ton, which corresponds to the maximum allowable weight of the whole tractor and implement which is carried equally on two wheels. The value of outward side force it can carry has been calculated as 3.15× O=20 ton so that O=6.4 ton, a very appropriate value.

The single shear bolt can only supply the correct amount of shear for the vertical loads and enough tensile strength for the sideways loads for wheels in which the torque ring is large relative to the tire diameter. When it is smaller, it is necessary to add small diameter bolts through the torque ring 18 and drive plate 21 and through holes with much greater clearance in the nave plate 11. These bolts can be arranged to fail one after the other after the main shear bolt has failed.

When the shear bolt (13) fractures, the wheel leaves the tractor cleanly and it is only necessary to unscrew the broken piece of shear bolt (13) and collect the undamaged torque ring (18) and fit a new wheel and tire (30).

Figure 4:
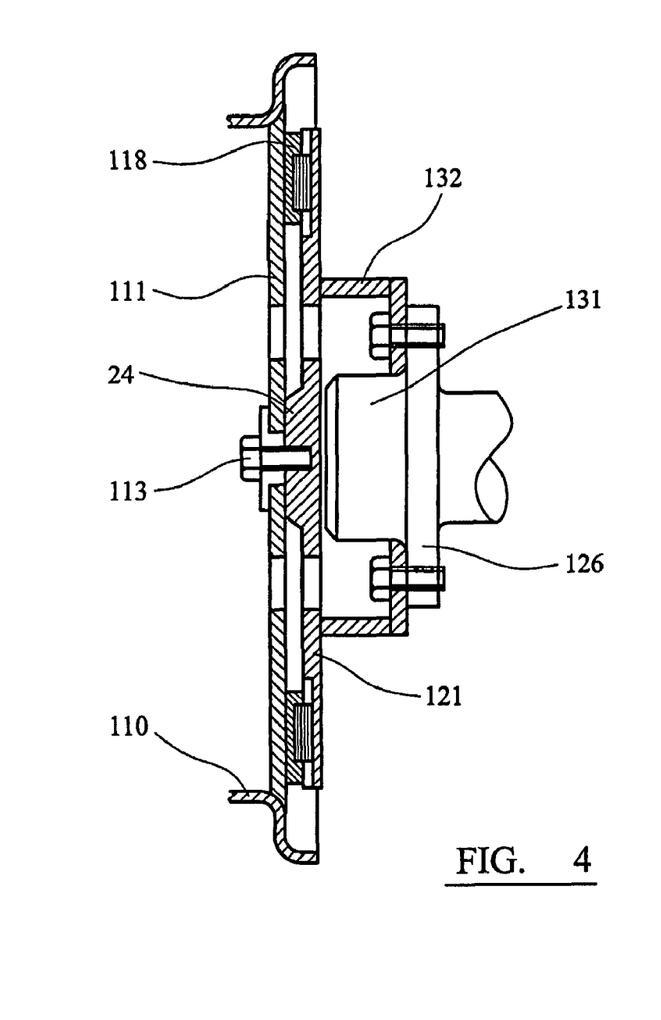
FIG. 4 is a cross sectional view of part of a wheel assembly of a second embodiment of the present invention.

Referring now to FIG. 4, in which parts common to the embodiment of FIGS. 2 and 3 are denoted by like reference numerals but increased by 100, a second embodiment of the invention, suitable for use with one of the front wheels of the tractor of FIG. 1, is shown. It has been found that an explosion under a tire has a considerable outward component as well as the main upward force, and the rim (110) of a typical tractor wheel is quite thin, as a result of which the explosion breaks the weld between the rim (110) and the nave plate (111) at the bottom and goes on to drive the bottom half of the rim (110) up into the top half, forming an inverted U which is projected outwards and upwards from the tractor. In order to accommodate a gear box (131) via which the wheel of FIG. 4 is mounted to an axle flange (126), the drive plate (121) is provided with a generally cylindrical extension (132). A second coupling device in the form of shear bolt 113 and a first coupling device in the form of torque ring 118 are also shown.

In order to accommodate a gear box (131) via which the wheel of FIG. 4 is mounted to an axle flange (126), the drive plate (121) is provided with a generally cylindrical extension (132).

The arrangement shown in FIG. 4 has the disadvantage that the wheel is set outwards a considerable distance from gearbox (131), which may not be strong enough to withstand the bending this imposes. A third embodiment of the invention shown in FIG. 5 can be used. In this arrangement the wheel is brought inwards so that its center is in line with the axle flange 226.

Figure 5:
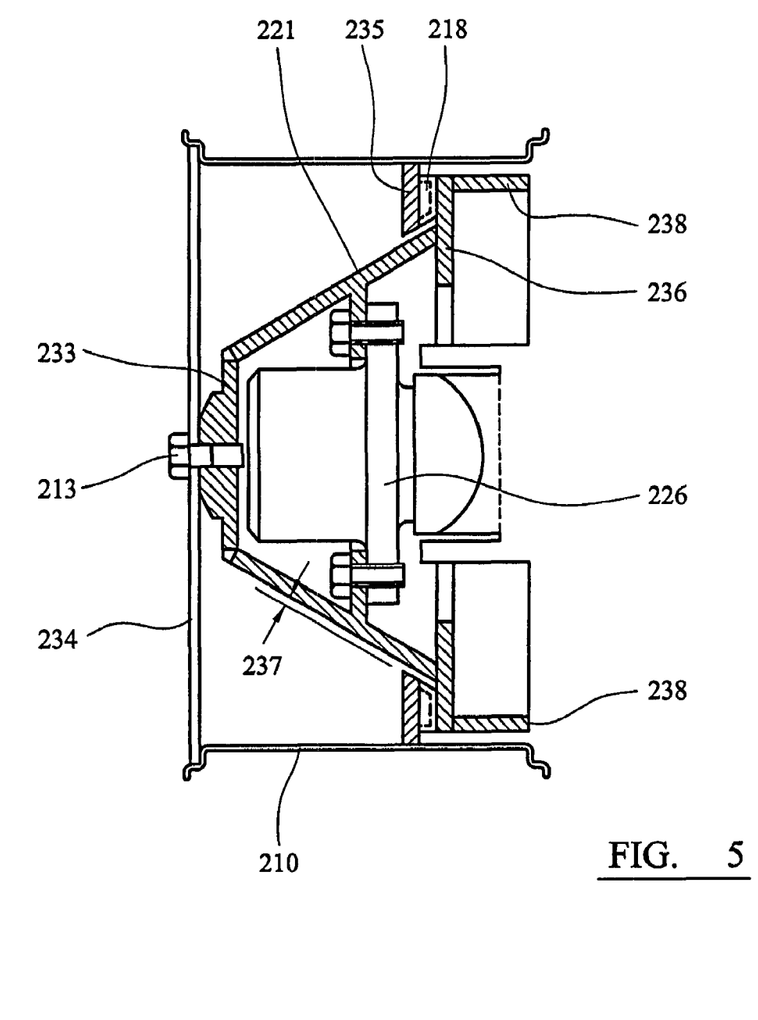
FIG. 5 is a cross sectional view of part of the wheel assembly of a third embodiment of the present invention.

Referring now to FIG. 5, in which parts common to the embodiment of FIGS. 2 and 3 are denoted by like reference numerals but increased by 200, a third embodiment of the invention is shown. This embodiment is intended to prevent the wheel rim (210) wrapping around the drive plate, which is now an assembly consisting of parts (221), (233), (236) and (238) and holding the rim (210) to the axle flange (226), increasing the transfer of load to the tractor and making the fitting of a new wheel more difficult. The drive plate (221) has a generally conical shape, having as steep an angle as possible. An additional plate (234) is provided towards the outside of the rim (210) and carries vertical and horizontal loads.

The torque into the wheel is applied through a separate flange (235), set as far into the wheel as possible, via torque ring (218) to a flange (236) fixed to the conical extension of drive plate extension (221). When an explosion occurs under the tire and shear bolt (213) fails, the rim (210) moves upwards closing gap (237) between the rim (210) and conical extension of drive plate (221). The rim (210) then slides along the conical surface of drive plate (221) under the combined effects of the conical shape and the outward component of the blast. A cylindrical extension (238) is provided to prevent the collapsing rim (210) from becoming trapped behind the flange (236).

Figure 6:
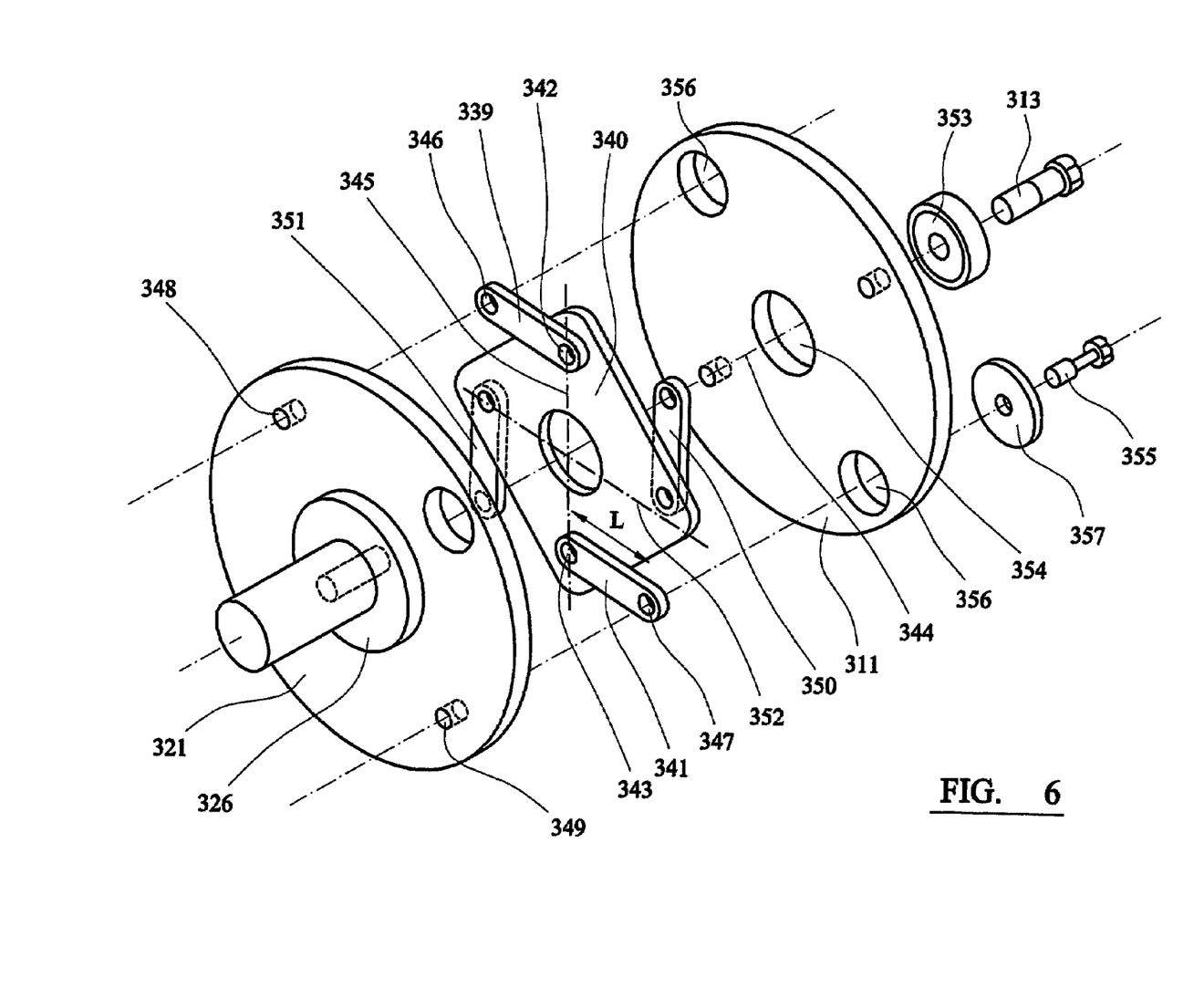
FIG. 6 is an exploded perspective view, corresponding to FIG. 2, of a wheel assembly of a fourth embodiment of the present invention.

Referring now to FIG. 6, a fourth embodiment of the invention is shown, in which parts common to the embodiment of FIGS. 2 and 3 are denoted by like reference numerals but increased by 300. The torque ring (18, 118, 218) having two pairs of key ways is replaced by a torque plate (340) having straight line linkages arranged at right angles to each other. This arrangement transmits torque from the drive plate (321) to the nave plate (311), without unduly restricting radial movement of the nave plate (311) relative to the drive plate (321).

Links (339, 341) of generally equal length L, are pivoted to the torque plate (340) by respective bolts through holes (342, 343). The centers of these bolts are placed generally equidistantly from shaft axis (344) on diameter line (345). The other ends (346, 347) of the links (339, 341) are pivoted to the drive plate (321) at pivot points (348, 349) respectively, which also lie on a diameter of the drive plate (321) and are generally equidistant from the shaft axis (344). As a result, links (339, 341) are generally parallel to each other and at right angles to diameter line (345) when the center point X of diameter (345) coincides with the shaft axis (344). This arrangement allows the center X of torque plate (340) to move in a straight line over short distances along diameter (345) on either side of the shaft axis (344). The distance over which this movement approximates to a straight line depends upon the length L of the links (339, 341), and in practice, these links should be made as long as practicable.

A similar arrangement is provided by links (350, 351) which connect the torque plate (340) to the nave plate (311). Diameter line (352) on which links (350, 351) are pivoted to the torque plate (340) is arranged generally at right angles to diameter line (345). This arrangement allows the nave plate (311) to move a short distance in a radial direction on either side of the shaft axis (344). The combined action of the straight line link system described in this embodiment simulates the movements permitted by the orthogonal key ways of the embodiment of FIG. 2, provided that the movements involved are small.

First coupling member in the form of shear bolt (313) is a close fit in hardened bush (353), which is fixed to a hole (354) in the nave plate (311). As in the previous embodiments, torque from the axle flange (326) is transmitted to nave plate (311) without significantly restricting the radial movement of the nave plate (311). The flange, torque and nave plate assembly are held together by two pairs of second coupling members in the form of bolts (355), of which only one bolt is shown in FIG. 6. These bolts (355) pass through enlarged holes (356) in the nave plate (311) and therefore do not restrict the radial movements of the nave plate (311). Typically, the shank of this bolt (355), in the region where it acts as the pivot (348, 349), has a diameter required to carry the heavy torque loads to the links (339, 341). The diameter of this bolt, in the region where it passes through the corresponding enlarged hole (356), is reduced so that is just sufficient to carry the small tensile load holding washer (357) against the face of nave plate (311) to clamp the plate assembly together.

With this arrangement, when the shear bolt (313) fails as a result of an explosive load, bolt (355) and the other three corresponding bolts (355) will shear off easily allowing the nave plate (311) to separate cleanly from the drive plate (321) without putting an undue load on the axle flange (326).

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A wheel assembly for a vehicle, the assembly comprising:
    a wheel rim adapted to support a tire;
    a first support plate mounted to said rim;
    a second support plate for mounting to an axle;
    at least one first coupling device, connected between said first and second support plates, for transferring torque between said first and second support plates and, when said first coupling device is engaged with said first and second support plates, prevention of radial displacement of the first support plate relative to the second support plate is independent of said at least one first coupling device; and
    at least one second coupling device, connected between said first and second support plates, for securing said first and second support plates together, said second coupling device preventing radial displacement of said first support plate relative to said second support plate;

wherein when radial forces exceed a predetermined level the or each said second coupling device is incapable of transferring said radial forces from said first support plate to said second support plate and the or each second coupling device enables removal of the wheel rim and said first support plate from said second support plate.

2. An assembly according to claim 1, wherein at least one said first coupling device includes at least one body member having at least one first engaging device for enabling the or each said body member to slide in a first direction relative to said first support plate, and at least one second engaging device for enabling the or each said body member to slide in a second direction; not parallel to said first direction, relative to said second support plate.

3. An assembly according to claim 1, wherein at least one said first coupling device includes at least one body member and a plurality of first linkages pivotably connected between at least one said body member and said first support plate, and a plurality of second linkages pivotably connected between at least one said body member and said second support plate.

4. An assembly according to claim 1, wherein at least one said second coupling device further includes at least one first coupling member connected between said first and second support plates and adapted to fracture as a result of application thereto of radial or axial forces exceeding said respective predetermined levels.

5. An assembly according to claim 4, wherein at least one second coupling device includes at least one second coupling member adapted to fracture as a result of fracture of at least one said first coupling member.

6. An assembly according to claim 1, wherein said second support plate is mounted to said axle via a gearbox.

7. An assembly according to claim 1, wherein said second support plate defines a region of decreasing cross section in a direction transverse to said axle.

8. An assembly according to claim 1, further comprising at least one removable securing device for securing said assembly to the axle.

9. A vehicle comprising:
(i) a chassis;
(ii) a cab for accommodating at least one occupant;
(iii) at least one wheel assembly comprising:
  a wheel rim adapted to support a tire;
  a first support plate mounted to said rim;
  a second support plate for mounting to an axle;
  at least one first coupling device, connected between said first and second support plates, for transferring torque between said first and second support plates and, when said first coupling device is engaged with said first and second support plates, prevention of radial displacement of the first support plate relative to the second support plate is independent of said at least one first coupling device; and
  at least one second coupling device, connected between said first and second support plates, for securing said first and second support plates together, said second coupling device preventing radial displacement of said first support plate relative to said second support plate;
  wherein when radial forces exceed a predetermined level the or each said second coupling device is incapable of transferring said radial forces from said first support plate to said second support plate and the or each second coupling device enables removal of the wheel rim and said first support plate from said second support plate; and
(iv) a respective axle provided on the chassis for supporting the or each said wheel assembly.

* * * * *

UNITED STATES PATENT AND TRADEMARK OFFICE
CERTIFICATE OF CORRECTION

| | |
|---|---|
| PATENT NO. | : 7,607,740 B2 |
| APPLICATION NO. | : 10/531364 |
| DATED | : October 27, 2009 |
| INVENTOR(S) | : Reece |

Page 1 of 1

It is certified that error appears in the above-identified patent and that said Letters Patent is hereby corrected as shown below:

The title page, Item (12) and Item (75) delete "Reese" and insert --Reece--

Signed and Sealed this

Fifteenth Day of June, 2010

David J. Kappos
*Director of the United States Patent and Trademark Office*